US012027766B2

(12) United States Patent
Hu

(10) Patent No.: US 12,027,766 B2
(45) Date of Patent: Jul. 2, 2024

(54) 5G MILLIMETER-WAVE NOVEL DUAL-POLARIZED HORN ANTENNA

(71) Applicant: Nan Hu, Beijing (CN)

(72) Inventor: Nan Hu, Beijing (CN)

(73) Assignee: Nan Hu, Beijing (CN)

(*) Notice: Subject to any disclaimer, the term of this patent is extended or adjusted under 35 U.S.C. 154(b) by 0 days.

(21) Appl. No.: 18/230,696

(22) Filed: Aug. 7, 2023

(65) Prior Publication Data

US 2023/0411857 A1 Dec. 21, 2023

Related U.S. Application Data

(63) Continuation of application No. PCT/CN2022/073564, filed on Jan. 24, 2022.

(51) Int. Cl.
*H01Q 13/02* (2006.01)

(52) U.S. Cl.
CPC ..... *H01Q 13/0275* (2013.01); *H01Q 13/0225* (2013.01)

(58) Field of Classification Search
CPC ............. H01Q 13/02–0291; H01Q 13/06–065
See application file for complete search history.

(56) References Cited

U.S. PATENT DOCUMENTS 11,749,896 B1 * 9/2023 Eubanks ................ H01Q 13/02 343/702
2002/0080081 A1 * 6/2002 Liu .................... H01Q 13/0275 343/786
2002/0126061 A1 * 9/2002 Griessbaum ........... H01Q 13/02 343/786
2009/0109111 A1 * 4/2009 McGonigle ........ H01Q 13/0208 343/786

(Continued)

FOREIGN PATENT DOCUMENTS

CN 108987925 A * 12/2018 ............... H01Q 1/50
CN 109509982 A 3/2019

(Continued)

OTHER PUBLICATIONS

The Design and Realization of Wide band double-ridged horn antenna, by Jianling huang, College of Engineering and Information Technology University of Chinese Academy of Sciences Apr. 2014.

*Primary Examiner* — Ab Salam Alkassim, Jr.
(74) *Attorney, Agent, or Firm* — Samson G. Yu

(57) ABSTRACT

Some embodiments of the present disclosure discloses a 5G millimeter-wave novel dual-polarized horn antenna. The antenna includes an upper plate, a lower plate, a front plate, a rear plate and a cover plate, the cover plate is disposed on a rear end of the antenna, the front plate and the rear plate are disposed between the upper and lower plate, an excitation cavity structure is defined in the upper plate, the lower plate, the front plate, the rear plate and the cover plate, an excitation cavity with a rectangular cross section is formed in the cavity structure, the cross section of the excitation cavity is gradually reduced from right to left and then kept unchangeable, the left end of the excitation cavity is sealed through the cover plate, the upper plate, the lower plate, the front plate and the rear plate in the excitation cavity all include a curve ridge.

9 Claims, 8 Drawing Sheets

(56) References Cited

U.S. PATENT DOCUMENTS

| | | | | |
|---|---|---|---|---|
| 2010/0033391 | A1* | 2/2010 | McLean | H01Q 13/085 343/786 |
| 2010/0079348 | A1* | 4/2010 | Dietmeier | H01Q 1/2233 343/784 |
| 2018/0191076 | A1* | 7/2018 | Zelenski | H01Q 13/0208 |
| 2021/0255227 | A1* | 8/2021 | Hu | G01R 29/0878 |

FOREIGN PATENT DOCUMENTS

| | | | | | |
|---|---|---|---|---|---|
| CN | 109755750 | A | | 5/2019 | |
| CN | 111342212 | A | | 6/2020 | |
| CN | 211295395 | U | | 8/2020 | |
| CN | 112436284 | A | * | 3/2021 | H01Q 13/0275 |
| CN | 112886254 | A | | 6/2021 | |
| CN | 112886255 | A | * | 6/2021 | H01Q 13/0208 |
| CN | 214280212 | U | * | 9/2021 | H01Q 13/0208 |
| CN | 214280213 | U | | 9/2021 | |

* cited by examiner

5G MILLIMETER-WAVE NOVEL DUAL-POLARIZED HORN ANTENNA

CROSS-REFERENCE TO RELATED DISCLOSURE

The present disclosure is a national stage disclosure of International Patent Disclosure No. PCT/CN2022/073564, which is filed on Jan. 24, 2022, and claims priority to Chinese Patent Disclosure No. 202110169216.0, filed on Feb. 7, 2021, and entitled "5G millimeter-wave novel dual-polarized horn antenna", the contents of which are hereby incorporated by reference in its entirety.

TECHNICAL FIELD

The present disclosure relates to a technical field of horn antennas, in specifically relates to a 5G millimeter-wave novel dual-polarized horn antenna.

BACKGROUND

A mass of 5G consumer electronics at present are in a research, development and verification stage and urgently need to be verified in performance. However, current millimeter-wave test antennas (test frequency is 18 GHz-50 GHz) are monopolized by foreign suppliers. Consequently, the antennas are high in price and long in delivery time and cannot cope with explosive increasing of domestic demands. Due to characters of 5G, each kind of products needs to be subjected to 360-degree sphere scanning in the test process so as to confirm antenna quality. In a traditional test method, multiple single-polarized antennas are adopted to form a test antenna array to carry out all-round testing on products (the multiple antennas are adopted for test instead of rotation). In the art known to inventors, dual-polarized high-gain horn antennas are poor in E-face and H-face directional diagram symmetry and instable in high-frequency directional diagram.

SUMMARY

Some embodiments of the present disclosure provide a 5G millimeter-wave novel dual-polarized horn antenna to solve the technical problems about how to capable of improving E-face and H-face directional diagram symmetry, more stable in high-frequency directional diagram and capable of improving gain flatness.

In order to solve the above technical problems, this disclosure provides a 5G millimeter-wave novel dual-polarized horn antenna. The 5G millimeter-wave novel dual-polarized horn antenna includes an upper plate, a lower plate, a front plate, a rear plate and a cover plate, and the cover plate is disposed on a rear end of the antenna, the front plate and the rear plate are disposed between the upper plate and the lower plate, protruding parts extending outwards are disposed on the outer surfaces of the upper plate, the lower plate, the front plate and the rear plate, the upper plate, the lower plate, the front plate, the rear plate and the cover plate form an excitation cavity structure, an excitation cavity with a cross section which is rectangular is disposed in the excitation cavity structure, the cross section of the excitation cavity is gradually reduced from right to left and then kept unchangeable, a left end of the excitation cavity is sealed with the cover plate, the upper plate, the lower plate, the front plate and the rear plate in the excitation cavity all include a curve ridge, and the included angle between two adjacent curve ridges is 90 degrees; and a first inserting groove structure is enclosed by inner sides of the left ends of the upper plate, the lower plate, the front plate and the rear plate, a boss is disposed on a end face of the right side of the cover plate, the boss is inserted into the first inserting groove structure, two rows of blind holes which are crossed are disposed on a left end face of the boss and are orthogonal with the four curve ridges.

In some embodiments, a plurality of Archimedes spiral curves are disposed on two large faces of each curve ridge; or a continuous corrugated groove is disposed on each curve ridge, and the continuous corrugated groove penetrating through two large faces of each curve ridge; or a plurality of strip-shaped sink grooves which are perpendicular to a outer side face of each curve ridge are disposed on two large faces of each curve ridge; or a plurality of strip-shaped sink grooves which are parallel to the outer side face of each curve ridge are disposed on the two large faces of each curve ridge.

In some embodiments, the 5G millimeter-wave novel dual-polarized horn antenna includes a first center column and a second center column, a first center hole and a second center hole penetrating through the curve ridges of the upper plate and the lower plate are formed in the upper plate and the lower plate correspondingly, the first center hole and the second center hole are oppositely arranged, a upper end of a first center column sequentially penetrates through the second center hole and the first center hole and then is electrically connected with a first connector which is fixed to the periphery of the upper plate, and a lower end of the first center column is fixed into the second center hole; a third center hole and a fourth center hole penetrating through the curve ridges of the front plate and the rear plate are formed in the front plate and the rear plate correspondingly, the third center hole and the fourth center hole are oppositely arranged, a rear end of the second center column sequentially penetrates through the third center hole and the fourth center hole and then is electrically connected with a second connector which is fixed to the periphery of the rear plate, and a front end of the second center column is fixed into the third center hole; and an interval is kept between the first center column and the second center column.

In some embodiments, a groove is disposed in the center of the boss, a convex ring is disposed in the periphery of the groove, a second inserting groove is disposed in the convex ring, a tail end of each of the curve ridge is inserted into the second inserting groove correspondingly, and the blind holes are disposed in the bottoms of the boss and the groove.

In some embodiments, the distance between the first center column and the second center column is 0.5 mm.

In some embodiments, a line of threaded installing holes are disposed on a front side and a rear side of each of the upper plate and the lower plate, the positions of the front plate and the rear plate which are corresponding to the upper plate and the lower plate include threaded installing holes, and the upper plate, the lower plate, the front plate and the rear plate are fixed together through the threaded installing holes and screws which are mutually matched.

In some embodiments, threaded blind holes are disposed in a left end face of the cover plate and used for installing a base.

In some embodiments, ridge curves of the curve ridges (6) conform to a curvilinear equation: $y=10^{(a*x+b)}+c*x$, y represents the height of the ridges, x represents the length of the ridges, and a, b and c are constants.

In some embodiments, the upper plate and the curve ridge on the upper plate are integrally; the lower plate and the curve ridge on the lower plate are integrally; the front plate and the curve ridge on the front plate are integrally; the rear plate and the curve ridge on the rear plate are integrally.

The adopted technical scheme has the beneficial effects that the antenna is simple, compact and small in structure, so that space is effectively saved; a 2.92 mm or 2.4 mm coaxial connector is adopted, impedance matching design is optimized, and the antenna bandwidth is super wide; the corresponding Archimedes spiral curve is formed on each curve ridge so that E-face and H-face directional diagram symmetry can be improved, the high-frequency directional diagram is more stable, and gain flatness is improved; and the blind holes are formed in the boss so that standing wave matching can be effectively adjusted, and the broadband working capability is improved. In addition, the second inserting grooves can conveniently limit the tail ends of the curve ridges so that assembling between the second inserting grooves and the curve ridges can be facilitated; in addition, corrugated structures can be also additionally arranged at the positions of the curve ridges so that E-face and H-face directional diagram symmetry can be improved, side lobes are reduced, and gain flatness is improved; and the strip-shaped sink grooves can be also additionally formed in the ridges so that surface current can be restrained, and the high-frequency directional diagram is improved.

BRIEF DESCRIPTION OF THE DRAWINGS

The present disclosure is further described in detail in combination with drawings and detailed implementing manners as below.

Figure 1:
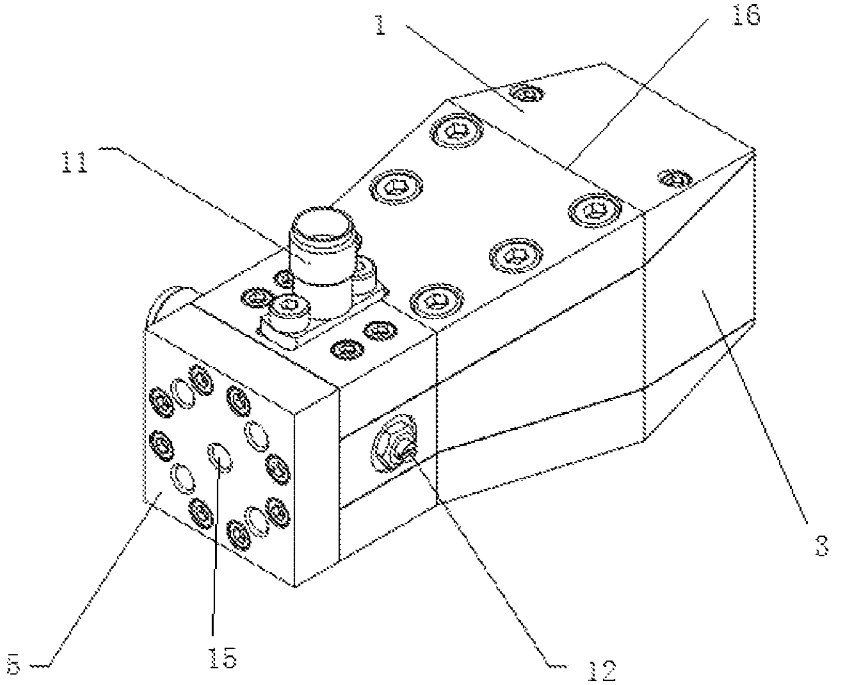
FIG. 1 illustrates a stereochemical structure schematic diagram of a horn antenna of the embodiment of the present disclosure.

1. upper plate; 2. lower plate; 3. front plate; 4. rear plate; 5. cover plate; 6—curve ridge; 7. Archimedes spiral curve; 8. boss; 9. blind hole; 10. first center column; 11. first connector; 12. second center column; 13. second connector; 14. threaded installing hole; 15. threaded blind hole; 16. protruding part; 17. convex ring; 18. second inserting groove; 19. corrugated groove; and 20. strip-shaped sink groove.

DETAILED DESCRIPTION OF THE EMBODIMENTS

The technical scheme in the embodiments of the present disclosure will be clearly and completely described below in combination with the drawings in the embodiments of the present disclosure, and it is apparent that the described embodiments are only a part rather all of embodiments of the present disclosure. All other embodiments obtained by ordinary skill in art based on the embodiments of the present disclosure shall fall within the protection scope of the present disclosure, without contributing creative labor.

Many concrete details are elaborated in the following description so that the present disclosure can be sufficiently understood, but the present disclosure can be also implemented by adopting other manners different from the manner described here, the skill in the art can make similar popularization without disobeying connotation of the present disclosure, so that the present disclosure is not limited by the following disclosed specific embodiments.

As shown in FIG. 1-FIG. 10, the embodiment of the present disclosure discloses a 5G millimeter-wave novel dual-polarized horn antenna including an upper plate 1, a lower plate 2, a front plate 3, a rear plate 4 and a cover plate 5, and the cover plate 5 is disposed on a rear end of the antenna, the front plate 3 and the rear plate 4 are disposed between the upper plate 1 and the lower plate 2, a line of threaded installing holes 14 are disposed in each of the front side and the rear side of each of the upper plate 1 and the lower plate 2, the positions, corresponding to the upper plate and the lower plate, of the front plate 3 and the rear plate 4 are include threaded installing holes 14, and the upper plate 1, the lower plate 2, the front plate 3 and the rear plate 4 are fixed together through the threaded installing holes and screws which are mutually matched.

Figure 2:
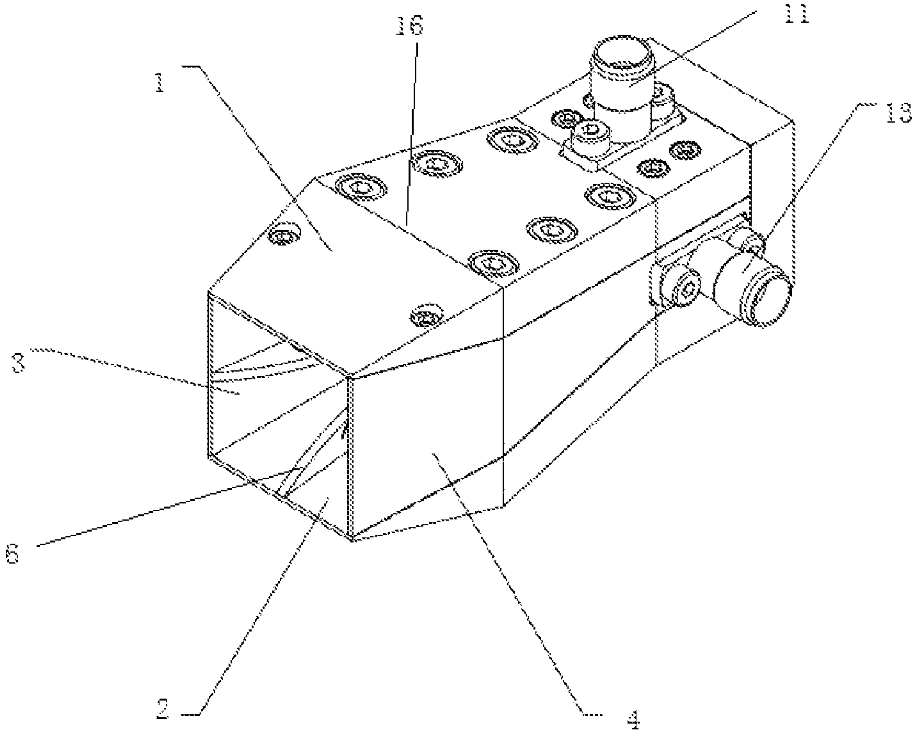
FIG. 2 illustrates a stereochemical structure schematic diagram of a horn antenna of the embodiment of the present disclosure.
Figure 3:
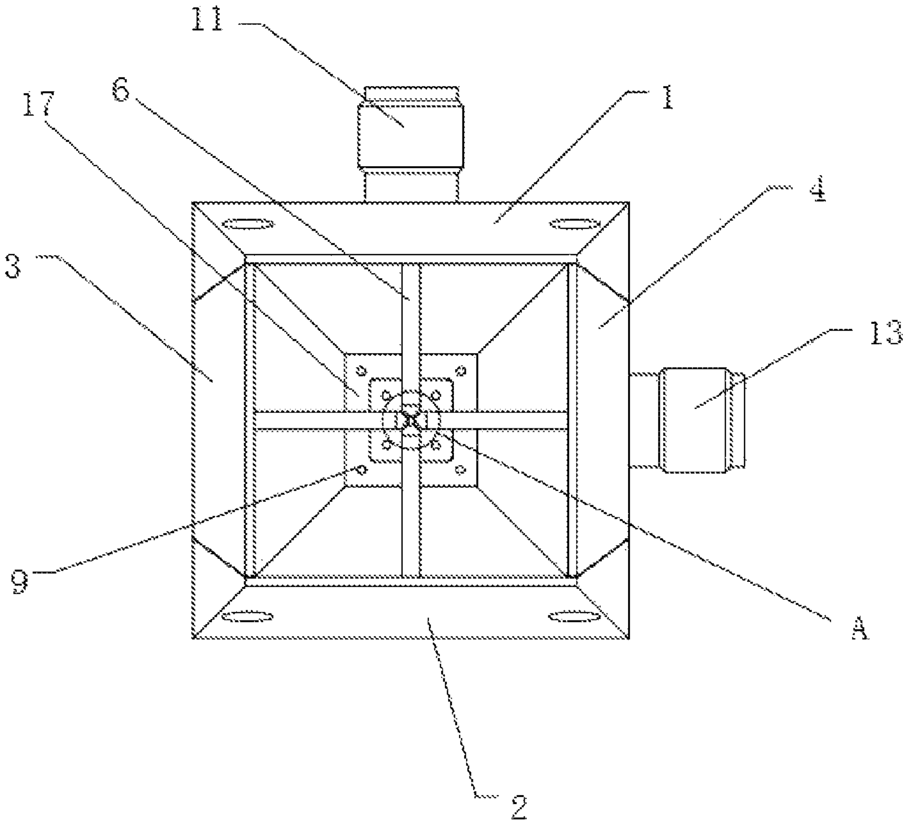
FIG. 3 illustrates a right-view structure schematic diagram of the horn antenna of the embodiment of the present disclosure.
Figure 4:
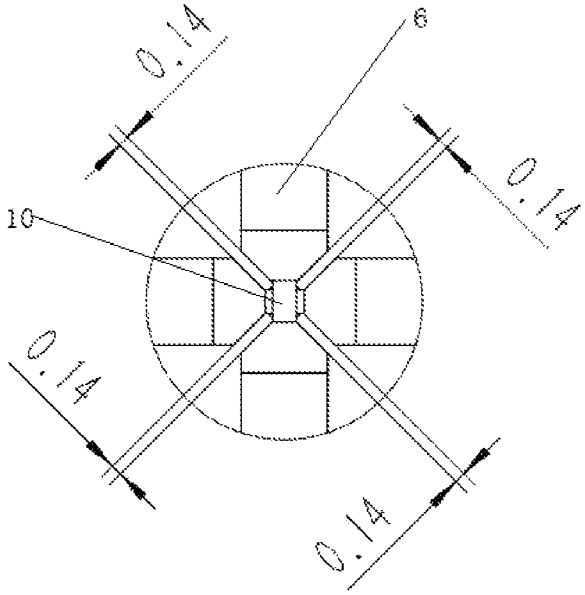
FIG. 4 illustrates a larger structure schematic diagram of a position A in FIG. 3.
Figure 5:
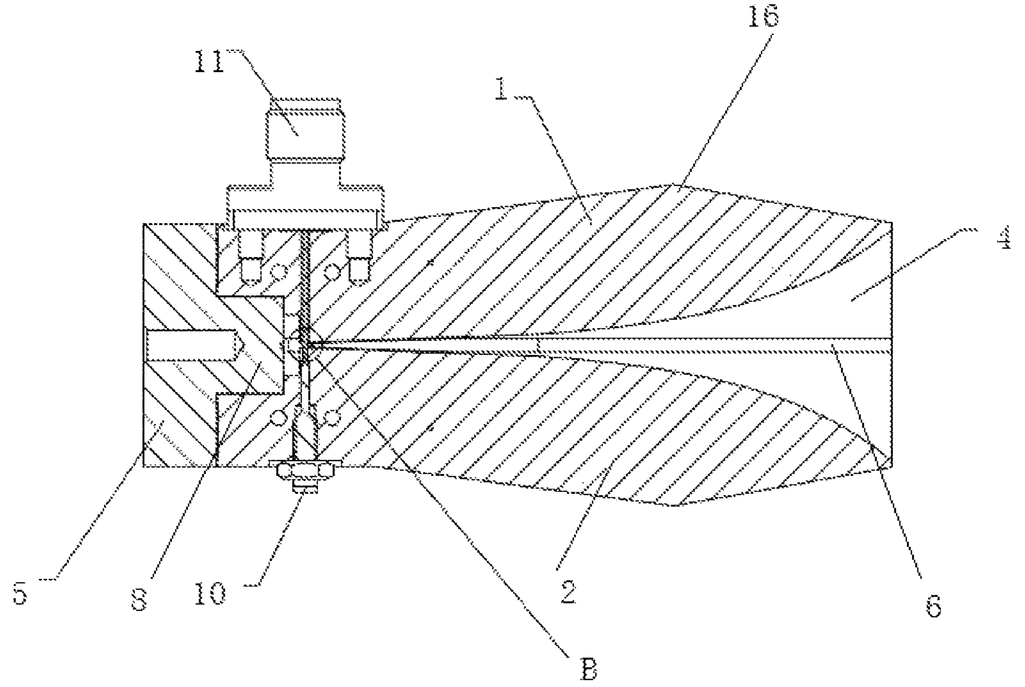
FIG. 5 illustrates a section view structure schematic diagram of the horn antenna of the embodiment of the present disclosure.

As shown in FIG. 1, FIG. 2 and FIG. 5, protruding parts 16 extending outwards are disposed on the outer surfaces of the upper plate 1, the lower plate 2, the front plate 3 and the rear plate 4, the upper plate 1, the lower plate 2, the front plate 3, the rear plate 4 and the cover plate form an excitation cavity structure, an excitation cavity with a rectangular cross section is disposed in the excitation cavity structure, the cross section of the excitation cavity is gradually reduced from right to left and then kept unchangeable, and the left end of the excitation cavity is sealed through the cover plate 5. Each of the upper plate 1, the lower plate 2, the front plate 3 and the rear plate 4 in the excitation cavity forms a curve ridge 6, and the included angle between two adjacent curve ridges is 90 degrees; and a plurality of Archimedes spiral curves 7 are formed on the curve ridges 6, the curve ridges 6 on the upper plate 1, the lower plate 2, the front plate 3 and the rear plate 4 are integrally arranged, the Archimedes spiral curves 7 are disposed on the two large faces of each curve ridge 6, and in addition, the Archimedes spiral curves 7 are disposed in the manner of groove cutting in the curve ridges 7.

Figure 11:
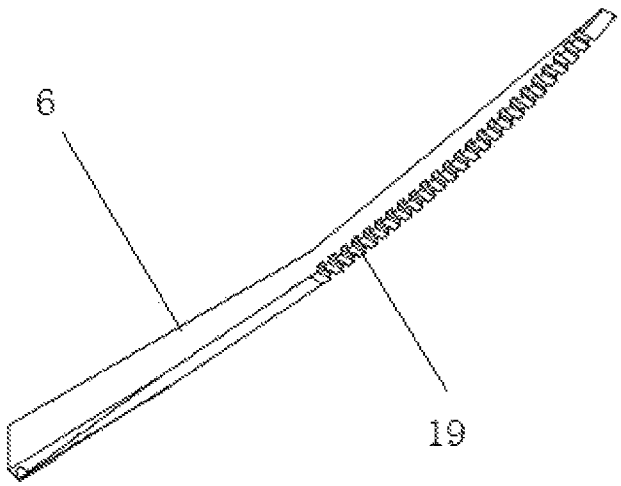
FIG. 11 illustrates a second structure schematic diagram of the curve ridges of the embodiment of the present disclosure.
Figure 12:
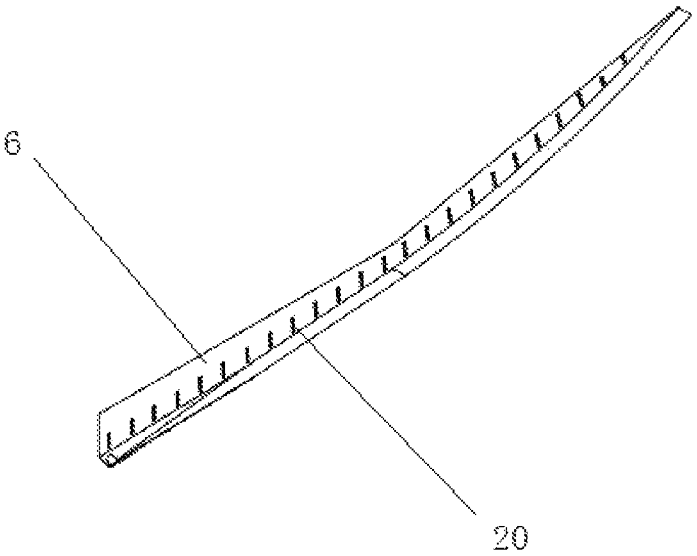
FIG. 12 illustrates a third structure schematic diagram of the curve ridges of the embodiment of the present disclosure.
Figure 13:
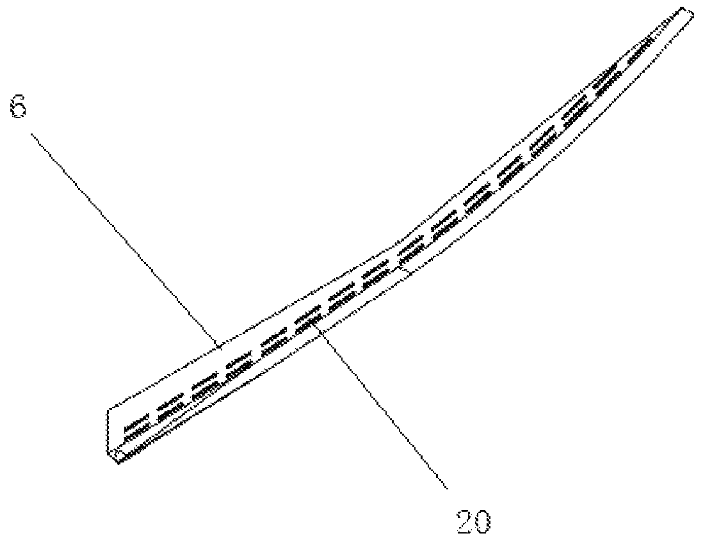
FIG. 13 illustrates a fourth structure schematic diagram of the curve ridges of the embodiment of the present disclosure.

As shown in FIG. 11, a continuous corrugated groove 19 penetrating through the two large faces of each curve ridge 6 can be formed in each curve ridge 6; or as shown in FIG. 12, a plurality of strip-shaped sink grooves 20 perpendicular to the outer side face of each curve ridge are formed in the two large faces of each curve ridge; or as shown in FIG. 13, a plurality of strip-shaped sink grooves 20 parallel to the outer side face of each curve ridge can be formed in the two large faces of each curve ridge 6.

Figure 7:
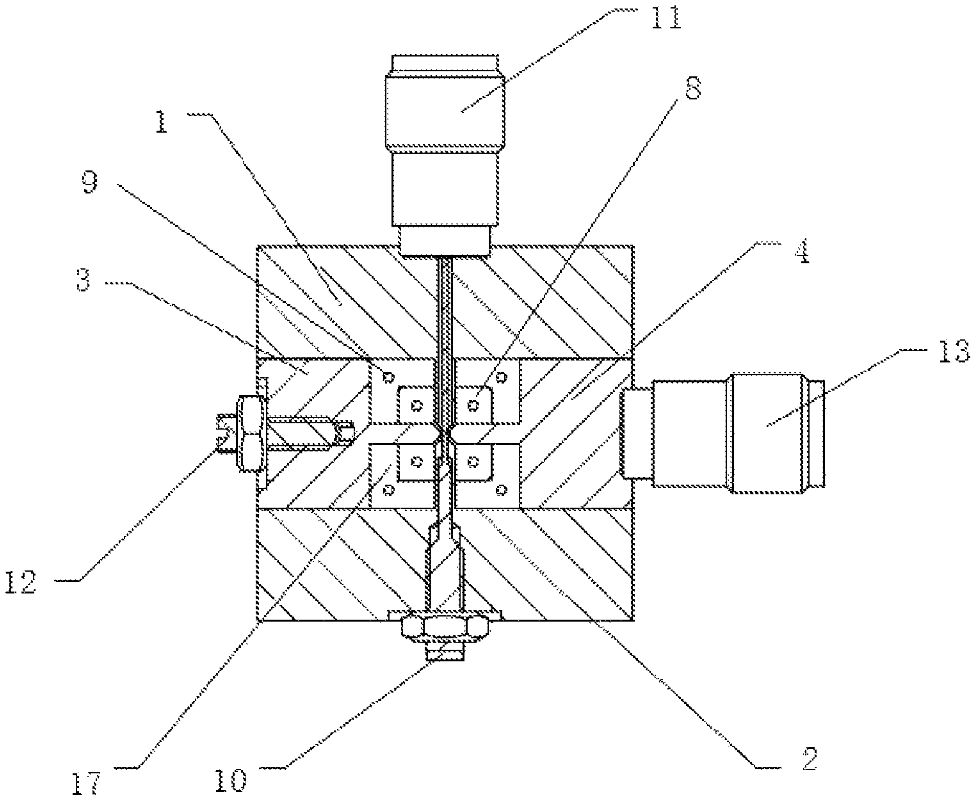
FIG. 7 illustrates a section view structure schematic diagram of the horn antenna of the embodiment of the present disclosure.
Figure 8:
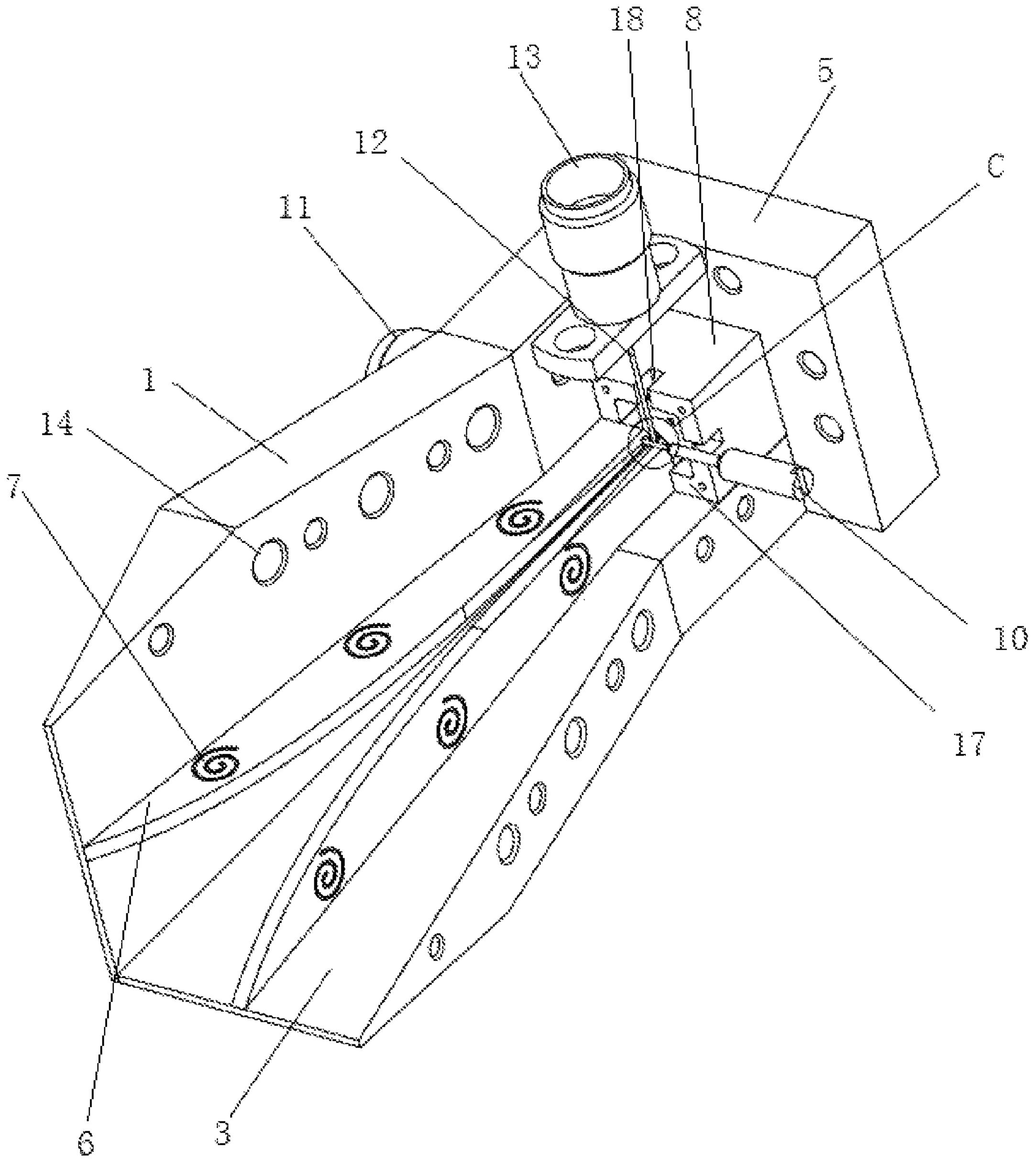
FIG. 8 illustrates a part breakdown structure schematic diagram of the horn antenna of the embodiment of the present disclosure.
Figure 9:
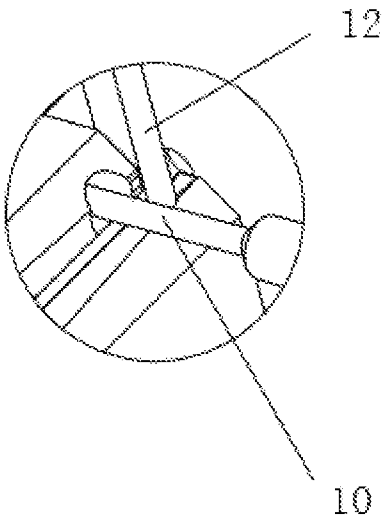
FIG. 9 illustrates a larger structure schematic diagram of a position C in FIG. 8.
Figure 10:
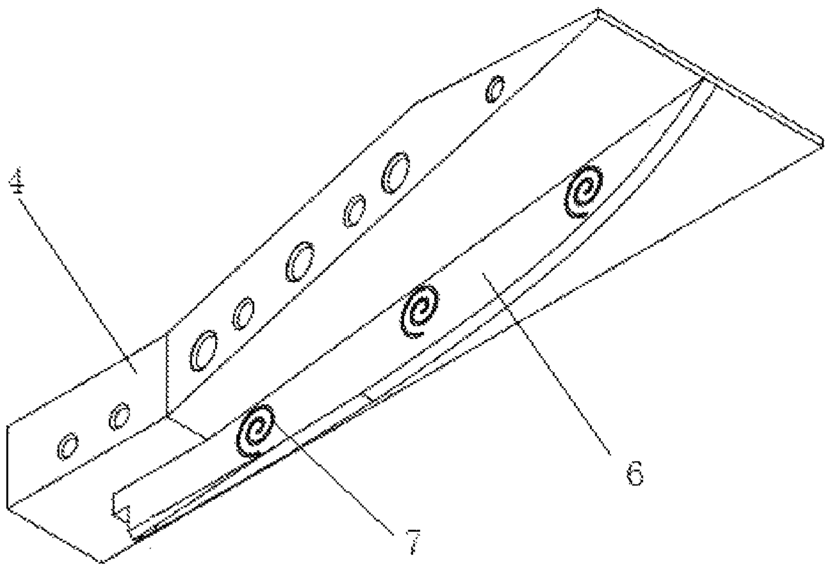
FIG. 10 illustrates a first structure schematic diagram of curve ridges and an upper plate of the embodiment of the present disclosure.

As shown in FIG. 5, FIG. 7 and FIG. 8, a first inserting groove structure is formed in the inner sides of the left ends of the upper plate 1, the lower plate 2, the front plate 3 and the rear plate 4, a boss 8 is formed in the end face of the right side of the cover plate 5, the boss 8 is inserted into a first inserting groove defined by the upper plate 1, the lower plate 2, the front plate 3 and the rear plate 4, and two rows of blind holes 9 which are crossed are formed in the left end face of the boss 8 and are orthogonal with the four curve ridges 6.

Figure 6:
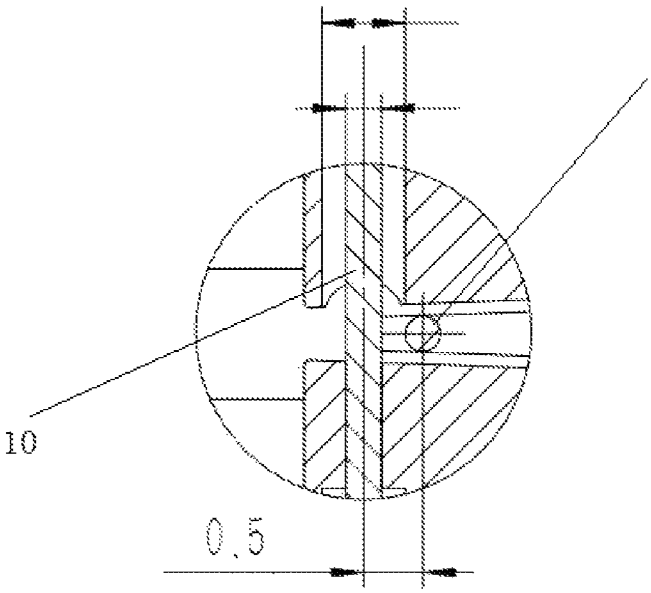
FIG. 6 illustrates a larger structure schematic diagram of a position B in FIG. 5.

As shown in FIG. 5-FIG. 9, a first center hole and a second center hole penetrating through the curve ridges 6 of the upper plate 1 and the lower plate 2 are formed in the upper plate 1 and the lower plate 2 correspondingly, the first center hole and the second center hole are oppositely arranged, the upper end of a first center column 10 sequentially penetrates through the second center hole and the first center hole and then is electrically connected with a first connector 11 fixed to the periphery of the upper plate 1, and the lower end of the first center column 10 is fixed into the second center hole; a third center hole and a fourth center hole penetrating through the curve ridges 6 of the front plate 3 and the rear plate 4 are formed in the front plate 3 and the rear plate 4 correspondingly, the third center hole and the fourth center hole are oppositely arranged, the rear end of a second center column 12 sequentially penetrates through the third center hole and the fourth center hole and then is electrically connected with a second connector 13 fixed to the periphery of the rear plate 4, and the front end of the second center column 12 is fixed into the third center hole; and an interval is kept between the first center column 10 and the second center column 12. Preferably, as shown in FIG. 6, the distance between the first center column 10 and the second center column 12 is 0.5 mm.

As shown in FIG. 1, threaded blind holes 15 are formed in the left end face of the cover plate 5 and used for installing a base. Preferably, ridge curves of the curve ridges 6 conform to a curvilinear equation: $y=10^{(a*x+b)}+c*x$, y represents the height of the ridges, x represents the length of the ridges, and a, b and c are constants.

In conclusion, the antenna is simple, compact and small in structure, so that space is effectively saved; a 2.92 mm or 2.4 mm coaxial connector is adopted, impedance matching design is optimized, and the antenna bandwidth is super wide; the corresponding Archimedes spiral curve is formed on each curve ridge so that E-face and H-face directional diagram symmetry can be improved, the high-frequency directional diagram is more stable, and gain flatness is improved; and the blind holes are formed in the boss so that standing wave matching can be effectively adjusted, and the broadband working capability is improved. In addition, corrugated structures can be also additionally arranged at the positions of the curve ridges so that E-face and H-face directional diagram symmetry can be improved, side lobes are reduced, and gain flatness is improved; and the strip-shaped sink grooves can be also additionally formed in the ridges so that surface current can be restrained, and the high-frequency directional diagram is improved.

What is claimed is:

1. A 5G millimeter-wave novel dual-polarized horn antenna, wherein the 5G millimeter-wave novel dual-polarized horn antenna comprises an upper plate, a lower plate, a front plate, a rear plate and a cover plate, and the cover plate is disposed on a rear end of the antenna, the front plate and the rear plate are disposed between the upper plate and the lower plate, protruding parts extending outwards are disposed on the outer surfaces of the upper plate, the lower plate, the front plate and the rear plate; the upper plate, the lower plate, the front plate, the rear plate and the cover plate form an excitation cavity structure, an excitation cavity with a cross section which is rectangular is disposed in the excitation cavity structure, the cross section of the excitation cavity is gradually reduced from right to left and then kept unchangeable, a left end of the excitation cavity is sealed with the cover plate, the upper plate, the lower plate, the front plate and the rear plate in the excitation cavity all comprise a curve ridge, and the included angle between two adjacent curve ridges is 90 degrees; and a first inserting groove structure is enclosed by inner sides of the left ends of the upper plate, the lower plate, the front plate and the rear plate, a boss is disposed on a end face of the right side of the cover plate, the boss is inserted into the first inserting groove structure, two rows of blind holes which are crossed are disposed on a left end face of the boss and are orthogonal with the four curve ridges.

2. The 5G millimeter-wave novel dual-polarized horn antenna as claimed in claim 1, wherein a plurality of Archimedes spiral curves are disposed on two large faces of each curve ridge; or a continuous corrugated groove is disposed on each curve ridge, and the continuous corrugated groove penetrating through two large faces of each curve ridge; or a plurality of strip-shaped sink grooves which are perpendicular to a outer side face of each curve ridge are disposed on two large faces of each curve ridge; or a plurality of strip-shaped sink grooves which are parallel to a outer side face of each curve ridge are disposed on the two large faces of each curve ridge.

3. The 5G millimeter-wave novel dual-polarized horn antenna as claimed in claim 2, further comprising a first center column and a second center column, a first center hole and a second center hole penetrating through the curve ridges of the upper plate and the lower plate are formed in the upper plate and the lower plate correspondingly, the first center hole and the second center hole are oppositely arranged, a upper end of the first center column sequentially penetrates through the second center hole and the first center hole and then is electrically connected with a first connector which is fixed to the periphery of the upper plate, and a lower end of the first center column is fixed into the second center hole; a third center hole and a fourth center hole penetrating through the curve ridges of the front plate and the rear plate are formed in the front plate and the rear plate correspondingly, the third center hole and the fourth center hole are oppositely arranged, a rear end of the second center column sequentially penetrates through the third center hole and the fourth center hole and then is electrically connected with a second connector which is fixed to the periphery of the rear plate, and a front end of the second center column is fixed into the third center hole; and an interval is kept between the first center column and the second center column.

4. The 5G millimeter-wave novel dual-polarized horn antenna as claimed in claim 3, wherein a groove is disposed in the center of the boss, a convex ring is disposed in the periphery of the groove, a second inserting groove is disposed in the convex ring, a tail end of each of the curve ridge is inserted into the second inserting groove correspondingly, and the blind holes are disposed in the bottoms of the boss and the groove.

5. The 5G millimeter-wave novel dual-polarized horn antenna as claimed in claim 3, wherein the distance between the first center column and the second center column is 0.5 mm.

6. The 5G millimeter-wave novel dual-polarized horn antenna as claimed in claim 1, wherein a line of threaded installing holes are disposed on a front side and a rear side of each of the upper plate and the lower plate, the positions of the front plate and the rear plate which are corresponding to the upper plate and the lower plate comprise threaded installing holes, and the upper plate, the lower plate, the front plate and the rear plate are fixed together through the threaded installing holes and screws which are mutually matched.

7. The 5G millimeter-wave novel dual-polarized horn antenna as claimed in claim 1, wherein threaded blind holes are disposed in a left end face of the cover plate and are configured to install a base.

8. The 5G millimeter-wave novel dual-polarized horn antenna as claimed in claim 1, wherein ridge curves of the curve ridges conform to a curvilinear equation: $y=10^{(a*x+b)}+c*x$, y represents the height of the ridges, x represents the length of the ridges, and a, b and c are constants.

9. The 5G millimeter-wave novel dual-polarized horn antenna as claimed in claim 1, wherein the upper plate and the curve ridge on the upper plate are integrally; the lower plate and the curve ridge on the lower plate are integrally; the front plate and the curve ridge on the front plate are integrally; the rear plate and the curve ridge on the rear plate are integrally.

* * * * *